US006103389A

United States Patent [19]

Tanaka et al.

[11] Patent Number: 6,103,389

[45] Date of Patent: Aug. 15, 2000

[54] THERMAL TRANSFER RECORDING MEDIUM

[75] Inventors: Noriatsu Tanaka; Yoshiaki Kumazawa, both of Hadano, Japan

[73] Assignee: Kabushiki Kaisha Pilot, Tokyo, Japan

[21] Appl. No.: 09/029,421

[22] PCT Filed: Jun. 20, 1997

[86] PCT No.: PCT/JP97/02136

§ 371 Date: Feb. 26, 1998

§ 102(e) Date: Feb. 26, 1998

[87] PCT Pub. No.: WO97/49562

PCT Pub. Date: Dec. 31, 1997

[30] Foreign Application Priority Data

Jun. 27, 1996 [JP] Japan .................................... 8-186644

[51] Int. Cl.[7] ...................................................... B32B 27/00

[52] U.S. Cl. .......................... 428/500; 428/195; 428/522; 347/217

[58] Field of Search .................................... 428/195, 211, 428/500, 522, 913, 914, 3.8, 318.25, 319, 212, 220, 332, 352; 347/217

[56] References Cited

FOREIGN PATENT DOCUMENTS 0 315 063 A2 10/1989 European Pat. Off. .
0 572 124 A2 1/1993 European Pat. Off. .

OTHER PUBLICATIONS

Derwent Publications Ltd., London, GB; Class A14, AN 95–272139 XP002087794 & JP 07 172074 A (Sony Corp), Jul. 11, 1995 (abstract).

*Primary Examiner*—Bruce H. Hess
*Assistant Examiner*—Michael E. Grendzynski
*Attorney, Agent, or Firm*—Finnegan, Henderson, Farabow, Garrett & Dunner, L.L.P.

[57] ABSTRACT

Provided is a thermal transfer recording medium which can be transferred well even onto a medium to be transferred such as a durable plastic film. The printed matters can obtain all together sufficiently high mechanical abrasion resistance, solvent resistance against various solvents and light fastness against rays such as UV rays. The above thermal transfer recording medium comprises at least a support and a thermal transfer ink layer provided on the support, wherein the thermal transfer ink layer contains a colorant and a vinyl chloride base copolymer obtained by copolymerizing three components of 50 to 90% by weight of vinyl chloride, 5 to 20% by weight of vinyl acetate and 10 to 30% by weight of hydroxyacrylate each based on the whole amount of the monomers.

4 Claims, No Drawings

THERMAL TRANSFER RECORDING MEDIUM

TECHNICAL FIELD

The present invention relates to a thermal transfer recording medium in which a thermal transfer ink layer provided on a support is transferred on a medium to be transferred by means of a heat source such as a thermal head printer to form an image, specifically to a thermal transfer recording medium in which an image can be transferred well on a medium to be transferred such as a plastic film and the transferred image is excellent in abrasion resistance against mechanical abrasion, solvent resistance against various solvents and light fastness against rays such as UV rays.

BACKGROUND ART

A thermal transfer recording system using a thermal head has come to be used for various uses such as label printers, ticket delivering machines and word processors. As these uses are expanded, printed matters have come to be used in a severer environment than in conventional ones.

Further, as printed matters are used in a severer circumstance, media to be transferred have been expanded in use from conventional paper to plastic films having less dependency on the environment. For example, there have been caused the problems that when such special media as a plastic film into which a thermal transfer ink can not penetrate are used for a medium to be transferred, ribbons containing conventional thermal transfer ink compositions mainly comprising waxes can not provide good transfer, or though images are transferred, the transferred images are removed by simple abrasion, and thus the required mechanical abrasion resistance can not be satisfied.

Further, a great variety of thermal heads is used for printers, and a speed-up in the printing speeds and an increase in the dot densities are intended, so that a heavy load is put on thermal transfer media used. Accordingly, thermal transfer media having more excellent transfer performance have been desired.

There have so far been known examples in which special resins or components are used in a thermal transfer ink layer to try to solve the problems described above. Thermal transfer recording materials containing colorants and specific kinds of resins limited in various conditions are disclosed in Japanese Patent Application Laid-Open No. Sho 62-13384, and as is the case with Japanese Patent Application Laid-Open No. Sho 63-230392, proposed are thermal transfer recording materials comprising a specific amount of each of colorants, specific kinds of resins limited in a glass transition point and lubricants.

They are intended to satisfy the transfer performance and the durability of the printed matters by virtue of the constitutions thereof. These proposals have provided the good transfer performance to some extent and the durability of the printed matters to some extent but have not been able to provide such sufficient effects as required in the present invention.

As described above, matters printed by thermal transfer printing by means of thermal heads have come to be used in a severer environment than in conventional ones. Such are, for example, use at severe room temperature, mechanical abrasion of printed matters, contact with solvents and use under an environment of exposing outdoors.

Such circumstances have resulted in using special durable media for media to be transferred as described above and have brought about problems on good transfer onto a plastic film and on obtaining printed matters having required durability.

That is, a large problem has been caused on compatibility of capability of good thermal transfer onto a durable medium to be transferred such as a plastic film with obtaining printed matters having sufficiently high mechanical abrasion resistance, solvent resistance against various solvents and light fastness against rays such as UV rays, and it has been considered that a large key for solving the problem described above resides in the components of a thermal transfer ink layer of a thermal transfer recording medium, a so-called ink ribbon. The compositions of thermal transfer ink layer components have so far been investigated, but proposals satisfying the standards required in the present invention have not yet been made. An object of the present invention is just to propose means for solving the problem described above.

DISCLOSURE OF THE INVENTION

The present inventors have found that the object described above can be achieved by providing a thermal transfer ink layer containing a specific vinyl chloride base copolymer on a support in order to solve the problem described above and have come to complete the present invention based on this knowledge.

That is, the thermal transfer recording medium of the present invention comprises at least a support and a thermal transfer ink layer provided on the above support, wherein the thermal transfer ink layer described above contains a colorant and a vinyl chloride base copolymer obtained by copolymerizing three components of 50 to 90% by weight of vinyl chloride, 5 to 20% by weight of vinyl acetate and 10 to 30% by weight of hydroxyacrylate each based on the whole amount of the monomers.

The vinyl chloride base copolymer described above has preferably a glass transition point of 45 to 65° C. and a molecular weight of 2000 to 10000. The molecular weight described above means a number average molecular weight (Mn).

According to the constitution described above, when carrying out thermal transfer onto a medium to be transferred by means of a thermal printer, good printing can be made even on a medium to be transferred having a surface condition in which thermal transfer is difficult because used is the preceding thermal transfer recording medium containing the vinyl chloride base copolymer obtained by copolymerizing the three components of vinyl chloride, vinyl acetate and hydroxyacrylate in the thermal transfer ink layer. Further, the images obtained by printing are not peeled off, damaged or deteriorated even by strong mechanical abrasion, contact with various solvents and exposure to light such as UV rays and can maintain a good printed condition.

BEST MODE FOR CARRYING OUT THE INVENTION

The vinyl chloride base copolymer used in the present invention is not a homopolymer of only vinyl chloride and has to be a copolymer obtained by copolymerizing the three components of vinyl chloride, vinyl acetate and hydroxyacrylate.

The polymer composition thereof has to be 50 to 90% by weight of vinyl chloride, 5 to 20% by weight of vinyl acetate and 10 to 30% by weight of hydroxyacrylate each based on the whole amount of the monomers in order to allow the good transfer performance to be compatible with the durability of the printed matters.

Further, the vinyl chloride base copolymer described above has preferably a glass transition point of 45 to 65° C. If the glass transition point is lower than this range, though the transfer performance is good, the film strength of the printed matters can not be maintained and a sufficiently high effect can not be obtained in the abrasion resistance of the images obtained by printing. On the other hand, if the glass transition point is higher than this range, heat energy given by a printer in transferring is insufficient and the copolymer is not softened such that sufficient thermal transfer can be carried out, so that insufficient transfer is caused. In addition, since the energy amount for transferring is short, the adhesive property of the copolymer to the transferred medium is inferior, and therefore the printed matters are peeled off by slight mechanical abrasion or contact with solvents.

Further, the vinyl chloride base copolymer described above has preferably a molecular weight of 2000 to 10000. If the molecular weight is lower than this range, though the transfer performance is good as well in this case, the film strength of the printed matters can not be maintained and a sufficiently high effect can not be obtained in the abrasion resistance of the images obtained by printing.

Since the low molecular weight elevates the solubility of the polymer into solvents and as a result, does not allow the printed matters to obtain sufficiently high durability, such low molecular weight is not preferred. In addition, since such polymer tends to be easily decomposed by UV rays, the light fastness of the printed matters is lowered, and therefore the low molecular weight is not preferred.

On the other hand, the molecular weight exceeding this range does not allow the polymer to be softened so much as sufficient thermal transfer can be carried out by heat energy given from a printer in transferring, so that insufficient transfer is caused. In this case, since the adhesive property of the polymer to a transferred medium is degraded, the printed matters are peeled off by slight mechanical abrasion or contact with solvents.

Meanwhile, other components have to be taken into consideration in order to constitute the thermal transfer ink layer having a good performance.

There can be used as a colorant, at least one of pigments such as carbon black, ultramarine blue, chrome yellow, cadmium yellow, hansa yellow, disazo yellow, permanent red, Alizarine lake, quinacridone red, benzimidazolone red, Victoria blue lake, phthalocyanine blue, phthalocyanine green and dioxazine violet, and dyes such as Auramine and Rhodamine. Pigments are preferred because they provide the printed matters with a good light fastness when the printed matters are used under such an environment as irradiated with UV rays outdoors, and the thermal transfer ink layer itself is improved in mechanical strength.

Dyes have high solubility into solvents, and therefore pigments are preferably used in terms of improving in solvent resistance.

The thermal transfer ink layer of the present invention comprises at least the colorant and the specific vinyl chloride base copolymer described above. Further, in order to enhance various performances such as abrasion resistance of printed matters, a ribbon-running property and ribbon preservability, additives may be blended as long as the basic performances of the present invention are not reduced. A blend amount thereof is varied according to the kind of the additives and is preferably 20% by weight or less relative to the whole thermal transfer ink layer. A coated amount of the thermal transfer ink layer is preferably 1.0 to 3.0 g/m$^2$.

Conventional resin films can suitably be used for the support used in the present invention.

It is essential in the thermal transfer recording medium of the present invention to provide a thermal transfer ink layer on a support, and other functional layers such as a releasing layer provided between the support and the thermal transfer ink layer may be provided.

A thermal transfer recording medium which is one example of the embodiments of the present invention shall be explained below.

As described above, various plastic films can be used for a resin film which is the support of the thermal transfer recording medium. A polyester film having a thickness falling in a level of 2.5 to 6.0 $\mu$m provided with a thermal resistant lubricant layer on the back thereof can preferably be used.

The thermal transfer recording medium of the present invention is constituted by providing the thermal transfer ink layer on the support, and a method of forming the thermal transfer ink layer shall not specifically be restricted. The components are dispersed and dissolved in a water base or oil base solvent to prepare a coating liquid, and the coating liquid is applied in a prescribed coated amount by a coating method such as a gravure coater, a wire bar coater and an air knife coater, whereby the thermal transfer recording medium can be obtained.

When the thermal transfer recording medium of the present invention is used to carry out recording, there can suitably used for a medium to be transferred, films of various plastics such as polyester, polyvinyl chloride, Yupo, Peach coat and Silver namer which are trade names for polypropylene, polyethylene, and polystyrene. The surface condition may be flat or processed to mat finish.

EXAMPLES

The present invention shall be explained below in detail with reference to examples, but the present invention shall not be restricted by the following examples.

[Part] shown in the following examples and comparative examples is based on weight unless otherwise described.

Example 1

A heat resistant lubricant layer was formed on one face of a polyester film having a thickness of 4.5 $\mu$m to prepare a support. Then, thermal transfer ink layer-forming components having the following composition were dispersed and dissolved in a mixed solvent of toluene and methyl ethyl ketone (7/3 ratio) so as to be a solid content of 30% by weight to prepare a coating liquid, and the coating liquid was applied on the face of the support opposite to the heat resistant lubricant layer in the coated amount of 2.0 $g/m^2$ and dried to form a thermal transfer ink layer, whereby a thermal transfer recording medium was obtained.

Thermal transfer ink layer-forming components:

| | |
|---|---|
| Vinyl chloride base copolymer*1 | 60 parts |
| Wax*2 | 10 parts |
| Carbon biack | 25 parts |
| Dispersant | 5 parts |

*1: Copolymer having a glass transition point of 53° C. and a molecular weight of 5500, obtained by copolymerizing vinyl chloride of 67% by weight, vinyl acetate of 11% by weight and hydroxyacrylate of 22% by weight.
*2: Polyethylene oxide wax having a melting point of 110° C.

Examples 2 to 3 and Comparative Examples 1 to 3

Thermal transfer recording media were prepared in the same manner as in Example 1, except that the thermal transfer ink layer-forming components having the following compositions were used.

Example 2

Thermal transfer ink layer-forming components:

| | |
|---|---|
| Vinyl chloride base copolymer*1 | 55 parts |
| Wax*2 | 15 parts |
| Phthalocyanine blue | 20 parts |
| Spherical fine powder | 5 parts |
| Dispersant | 5 parts |

Example 3

Thermal transfer ink layer-forming components:

| | |
|---|---|
| Vinyl chloride base copolymer*1 | 75 parts |
| Quinacridone red | 20 parts |
| Dispersant | 5 parts |

Comparative Example 1

Thermal transfer ink layer-forming components:

| | |
|---|---|
| Vinyl chloride base copolymer*3 | 60 parts |
| Wax*2 | 10 parts |
| Carbon black | 25 parts |
| Dispersant | 5 parts |

*3: Copolymer having a glass transition point of 70° C. and a molecular weight of 20000, obtained by copolymerizing vinyl chloride of 91% by weight, vinyl acetate of 3% by weight and polyvinyl alcohol of 6% by weight.

Comparative Example 2

Thermal transfer ink layer-forming components:

| | |
|---|---|
| Vinyl chloride base copolymer*4 | 60 parts |
| Wax*2 | 10 parts |
| Carbon black | 25 parts |
| Dispersant | 5 parts |

*4: Copolymer having a glass transition point of 65° C. and a molecular weight of 15000, obtained by copolymerizing vinyl chloride of 81% by weight, vinyl acetate of 4% by weight and hydroxyacrylate of 15% by weight.

Comparative Example 3

Thermal transfer ink layer-forming components:

| | |
|---|---|
| Hydrogenated alicyclic hydrocarbon base petroleum resin*5 | 20 parts |
| EVA copolymer*6 | 50 parts |
| Wax*2 | 10 parts |
| Phthalocyanine blue | 20 parts |

*5: A glass transition point of 60° C. and a softening point of 100° C.
*6: Copolymer having a glass transition point of 30° C. and a softening point of 50° C., obtained by copolymerizing ethylene of 72% by weight and vinyl acetate of 28% by weight.

Six kinds of the thermal transfer recording media thus prepared were installed in a thermal transfer printer, and media to be transferred such as a white polyester label, a polyvinyl chloride label, a Yupo label, (trade name of Oji Youka Goseisi Corp.) a Peach coat label (trade name of Nissinbo Corp.) and a Silver namer label (Trade name of Lintec Corp.) were used to carry out printing on the printing conditions of 8 dots/mm, 0.2 to 0.4 mj/dot and 2 inch/min, whereby printed matters were obtained. The printing results are shown in Table 1.

TABLE 1

| | Example | | | Comparative Example | | |
|---|---|---|---|---|---|---|
| | 1 | 2 | 3 | 1 | 2 | 3 |
| Transfer performance | ◎ | ◎ | ◎ | X | X | ○ |
| Abrasion resistance | ◎ | ◎ | ◎ | ○ | ○ | X |
| Solvent resistance | ◎ | ◎ | ◎ | ○ | ○ | X |
| Light fastness | ◎ | ◎ | ◎ | ○ | ○ | Δ |

The transfer performance and the abrasion resistance, the solvent resistance and the light fastness of the printed matters were evaluated by the following test methods.

Transfer Performance:

After carrying out printing by means of a thermal transfer printer, the printed matters were observed under a microscope of 500 magnifications to see whether or not the printing patterns were accurately transferred.

Abrasion Resistance of the Printed Matters:

After carrying out printing by means of the thermal transfer printer, the printed matters were abraded back and forth 100 times by a felt/a steel ball having a diameter of 2 mm on which a load of 200 g was applied, and then the condition of the printed matters was observed.

Solvent Resistance of the Printed Matters:

After carrying out printing by means of the thermal transfer printer, the printed matters were dipped in ethyl alcohol and engine oil for 24 hours, and then the condition of the printed matters was observed.

Light Fastness of the Printed Matters:

After carrying out printing by means of the thermal transfer printer, the printed matters were irradiated with UV rays for 600 hours by means of a super fademeter and then rubbed with a felt to observe the condition of the printed matters.

As apparent from the results shown in Table 1, all the thermal transfer recording media of the present invention prepared in Examples 1 to 3 are excellent in a transfer performance as well as the abrasion resistance, the solvent resistance and the light fastness of the printed matters.

In contrast with this, the thermal transfer recording media prepared in Comparative Examples 1 and 2 cause insufficient transfer or have inferior sharpness in a transfer performance, and the media having a high grade were not obtained. Meanwhile, the abrasion resistance, the solvent resistance and the light fastness were relatively good at the transferred parts.

The thermal transfer recording medium prepared in Comparative Example 3 was not so inferior in a transfer performance as Comparative Examples 1 and 2 but was poor in an abrasion resistance and inferior in solvent resistance and light fastness as well.

Industrial Applicability

As described above, the thermal transfer recording medium of the present invention is constituted by providing the thermal transfer ink layer containing the specific vinyl chloride base copolymer on the support and therefore can provide good printing even on a durable medium to be transferred having a surface condition in which thermal transfer is difficult. In addition, it provides the excellent effect that the images obtained by printing are not peeled off, damaged or deteriorated even by strong mechanical abrasion, contact with various solvents and exposure to light such as UV rays and can maintain a good printed condition.

We claim:

1. A thermal transfer recording medium comprising at least a support and a thermally transferable ink layer formed on said support, wherein said thermally transferable ink layer contains a colorant and a vinyl chloride base copolymer obtained by copolymerizing monomers of vinyl chloride, vinyl acetate and hydroxyacrylate and containing 50 to 90% by weight of vinyl chloride, 5 to 20% by weight of vinyl acetate and 10 to 30% weight of hydroxyacrylate, each based on the whole amount of the monomers.

2. The thermal transfer recording medium according to claim 1, wherein said vinyl chloride base copolymer has a glass transition point of 45 to 65° C. and a number average molecular weight of 2000 to 10000.

3. The thermal transfer recording medium according to claim 1, further including a thermal resistant lubricant layer on a side of the support opposite the side on which the ink layer is formed.

4. The thermal transfer recording medium according to claim 1, wherein the ink layer is formed by applying on a side of the support a coating liquid prepared by dissolving said copolymer in a solvent.

* * * * *